(12) United States Patent
Zurek et al.

(10) Patent No.: US 7,047,805 B2
(45) Date of Patent: May 23, 2006

(54) FLUID FLOW METER HAVING AN AUXILIARY FLOW PASSAGE

(75) Inventors: Lawrence A. Zurek, Warren, MI (US); Eric C. Myers, Howell, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 56 days.

(21) Appl. No.: 10/821,440

(22) Filed: Apr. 9, 2004

(65) Prior Publication Data

US 2005/0223794 A1 Oct. 13, 2005

(51) Int. Cl.
*G01F 1/68* (2006.01)

(52) U.S. Cl. .................... 73/202.5; 73/204.22

(58) Field of Classification Search ............... 73/202, 73/202.5, 204.22
See application file for complete search history.

(56) References Cited

U.S. PATENT DOCUMENTS

| | | | |
|---|---|---|---|
| 4,142,407 A | 3/1979 | Kuroiwa et al. | |
| 4,433,576 A | 2/1984 | Shih et al. | |
| 4,463,601 A | 8/1984 | Rask | |
| 4,604,895 A | 8/1986 | Watkins | |
| 5,537,870 A | 7/1996 | Zurek et al. | |
| 5,563,340 A | 10/1996 | Clowater et al. | |
| 5,631,415 A | 5/1997 | Igarashi et al. | |
| 5,804,718 A | 9/1998 | Nagasaka et al. | |
| 5,847,275 A | 12/1998 | Kondo et al. | |
| 6,185,998 B1 | 2/2001 | Yonezawa et al. | |
| 6,223,594 B1 | 5/2001 | Takiguchi et al. | |
| 6,422,070 B1 | 7/2002 | Reymann et al. | |
| 6,622,555 B1 | 9/2003 | Straight et al. | |
| 6,708,561 B1 * | 3/2004 | Zurek et al. ............. | 73/204.22 |
| 2003/0101810 A1 | 6/2003 | Uramachi et al. | |
| 2003/0196486 A1 | 10/2003 | Zurek et al. | |

* cited by examiner

*Primary Examiner*—Harshad Patel
(74) *Attorney, Agent, or Firm*—Brinks Hofer Gilson & Lione

(57) ABSTRACT

A device for measuring fluid flowing in a duct is disclosed. The device includes a housing having a first flow passage, a nozzle, a second flow passage, a first electrical element, and a second electrical element. The first flow passage receives a first portion of the fluid flowing in the duct. The nozzle is connected to the housing and in fluid communication with the first flow passage. The second flow passage is defined by at least a first and second surface disposed in the housing, wherein the first surface has a first surface portion inclined relative to a second surface portion. The first electrical element is mounted in the first flow passage proximate to the nozzle. The second electrical element is mounted in the second flow passage. The first and second electrical elements are connected to at least one circuit for detecting a characteristic of the flowing fluid.

28 Claims, 4 Drawing Sheets

FLUID FLOW METER HAVING AN AUXILIARY FLOW PASSAGE

TECHNICAL FIELD

The present invention relates to devices and methods for measuring fluid flow in a duct.

BACKGROUND

Internal combustion engines today utilize electronic controls to achieve optimal engine operation. Typically, the electronic control systems include a primary control unit for processing control algorithms and a variety of sensors for providing control signals to the primary control unit. One important sensor for achieving optimal engine control is a mass fluid flow sensor for measuring air intake into the internal combustion engine.

It is important that the mass fluid flow measurement is accurate in order to provide optimal engine operation. One significant problem affecting the mass fluid flow measurement, is reverse flow or back flow in the direction opposite of engine air intake. Typically, mass fluid flow sensors detect the flow of air in both the forward and reverse directions relative to air intake, therefore reverse flow causes an inaccurate mass fluid flow reading.

Prior art mass fluid/air flow devices have attempted to address this problem by providing mass air flow sensor configured as disclosed in U.S. Pat. No. 5,563,340 issued to Clowater et al. in Clowater, a mass air flow sensor having a U-shaped air passage and a longitudinally converging elliptical inlet configuration is disclosed, and hereby incorporated by reference. This configuration increased measurement efficiency and reduced the effect of back flow on the measurement of mass air flow into the internal combustion engine. Further, such a configuration produces advantageously low signal to noise ratio, as well as high velocity flow across the mass fluid flow sensor element.

While prior art mass fluid/air flow sensors, such as the one disclosed in Clowater, significantly improved the accuracy of the mass fluid flow measurement improvements are still needed to address other problems. For example, it would be advantageous to provide a mass fluid/air flow sensor that provided enhanced cooling control of the sensing elements used to detect the mass of the flowing fluid. Such enhanced cooling control of the sensing elements provides a more accurate reading of the mass of the flowing fluid.

SUMMARY

In an embodiment of the present invention, a device for measuring fluid flowing in a duct is provided. The device includes a housing having a first flow passage that is positionable in the fluid carrying duct, a inlet, an auxiliary flow passage, a first electrical element, and a second electrical element. The first flow passage receives a first portion of the fluid flowing in the duct. The inlet is connected to the housing and in fluid communication with the first flow passage. The auxiliary flow passage is defined by at least a first and second surface disposed in the housing, wherein the first surface has a first surface portion inclined relative to a second surface portion. The first electrical element is mounted in the first flow passage proximate to the nozzle. The second electrical element is mounted in the auxiliary flow passage. The first and second electrical elements are connected to a circuit for detecting a characteristic of the flowing fluid.

In another embodiment of the present invention, control electronics are located in a longitudinally extending section of the mass fluid flow sensor housing above the first flow passage. Thus, the present invention provides an integrated circuit cavity and flow passage in one package.

In yet another embodiment of the present invention, an electrical element is located within the flow passage at the exit or outlet of the inlet, in accordance with the present invention.

In yet another aspect of the present invention, the electrical element is centered at the exit of a converging nozzle.

In still another embodiment of the present invention, the control electronics are located adjacent the flow passage within a circuit cavity.

In still another embodiment of the present invention, the first surface is a ceiling of the second flow passage that is inclined relative to the second surface.

In still another embodiment of the present invention, the auxiliary flow passage further comprises a wall.

In still another embodiment of the present invention, the wall is attached to the second surface of the auxiliary flow passage.

In still another embodiment of the present invention, the wall is attached to the first surface of the auxiliary flow passage.

In still another embodiment of the present invention, the wall includes a curved inboard surface.

In still another embodiment of the present invention, the wall has an end that terminates at an end of the second electrical element.

In yet another embodiment of the present invention, the auxiliary flow passage further comprises a wedge-shaped rear wall.

In still another embodiment of the present invention, a device for measuring fluid flowing in a duct is provided. The device includes a housing positionable in the fluid carrying duct, a nozzle, an second flow passage, a first electrical element, and a second electrical element. The housing defines a first flow passage for receiving a first portion of the fluid flowing in the duct. The nozzle is connected to the housing and in fluid communication with the first flow passage. The second flow passage is defined by a floor, a ceiling, a side wall and a rear wall disposed in the housing. The floor has a first floor portion that is inclined relative to a second floor portion. The first electrical element is mounted in the first flow passage proximate to the nozzle. The second electrical element is mounted in the second flow passage on at least one of the floor, the ceiling, the side wall and the rear wall. The first and second electrical elements are connected to a circuit for detecting a characteristic of the flowing fluid.

Further aspects, features and advantages of the invention will become apparent from consideration of the following description and the appended claims when taken in connection with the accompanying drawings.

DESCRIPTION

Figure 1:
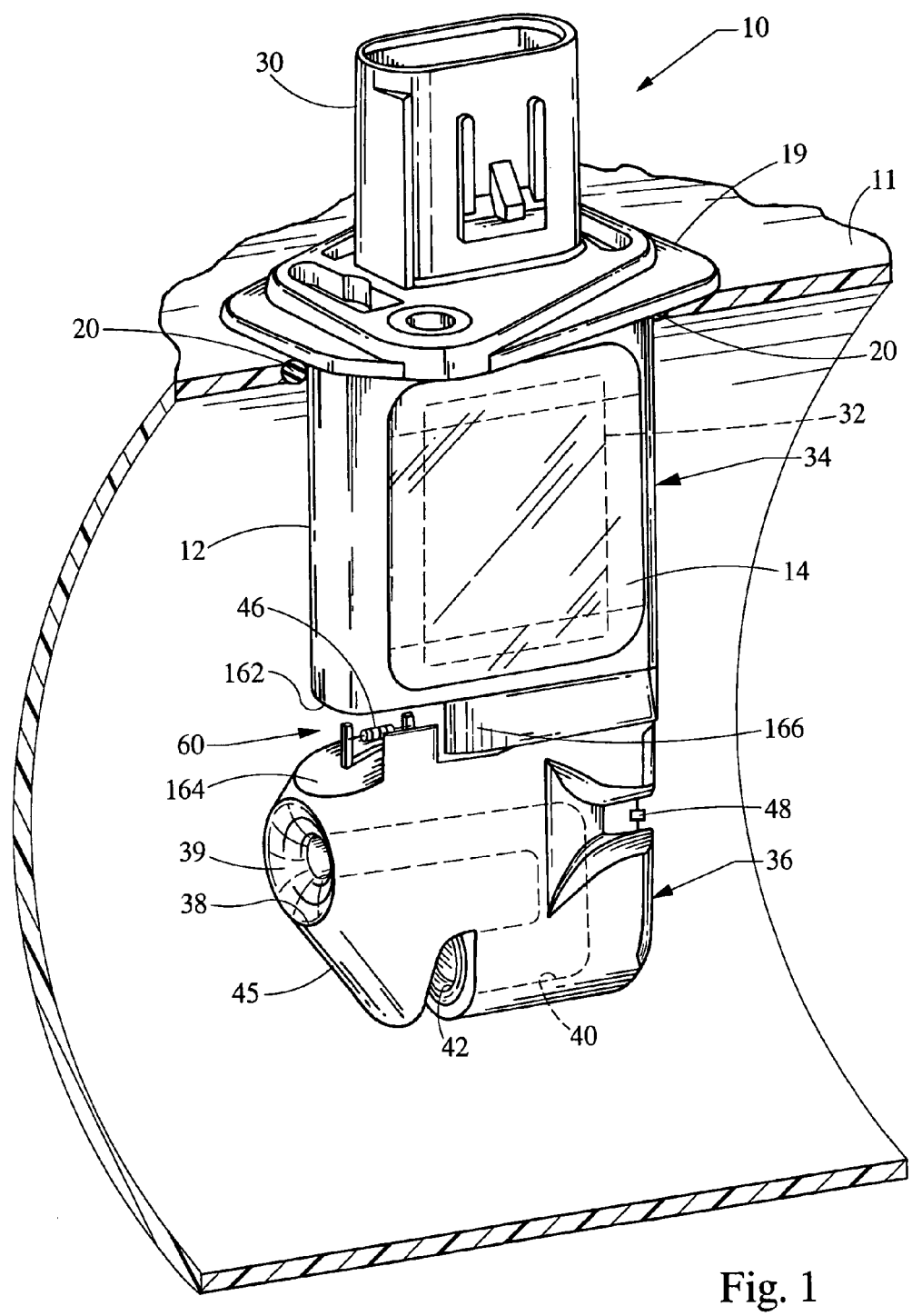
FIG. 1 is a perspective view showing the front and right side of a mass fluid flow sensor, in accordance with an embodiment of the present invention.

Referring now to FIG. 1, a perspective view showing the front and right side of a mass fluid flow sensor 10 is illustrated, in accordance with an embodiment of the present invention. Mass fluid flow sensor 10 may be used to calculate the amount of fluid flowing in a duct or passage 11. One application or use for sensor 10 is for measuring the amount of air inducted into an internal combustion engine (not shown). However, the present invention contemplates other uses and applications for sensor 10. For example, sensor 10 may be used to calculate the amount of fluid (other than air) flowing through duct or passage 11 (other than an air intake duct of an internal combustion engine). Mass fluid flow sensor 10 includes a housing 12, electronics cover 14, heat sink cover 18 (shown in FIG. 4), a gasket 20 and a circuit module 32.

Sensor 10 is inserted into duct 11 and seals against the duct utilizing gasket 20 that is disposed between a flange 19 and duct 11. Housing 12 includes an integral connector 30 having connector terminals (not shown) that may be connected to an engine control electronics (not shown) and circuit module 32. The engine control electronics are remote from mass fluid flow sensor 10. The circuit module 32 is disposed within a central housing portion 34. Circuit module 32 is placed in contact with heat sink cover 18 on a first side of circuit module 32 to remove heat from the circuit module. Heat sink 18 is cooled by fluid flowing in duct 11. Electronics cover 14 is disposed on a second side of circuit module 32 and allows access to the circuit module during manufacture of the sensor. Both electronics cover 14 and heat sink 18 are configured to seal against central housing portion 34. Adjacent central housing portion 34 is an integrally attached fluid sampling portion 36. Fluid sampling portion 36 includes an inlet 38 that opens into a nozzle 39. Nozzle 39 communicates with a substantially U-shaped flow passage 40. U-shaped flow passage 40 terminates at an outlet 42.

Nozzle 39 has, generally, a jet nozzle configuration or shape. As will be further illustrated and described, nozzle 39 is defined by a generally circular opening or inlet 38 that meets longitudinally converging elliptical side surfaces. The longitudinally converging elliptical side surfaces of the nozzle create a relatively high pressure at nozzle exit 41 (shown in FIG. 3) of nozzle 39. Further, the jet nozzle configuration of nozzle 39 creates a critical area 43 located at nozzle exit 41 having a uniform fluid flow velocity across the critical area. This critical area 43 created by the nozzle provides enhanced fluid flow detection and measurement as will be described hereinafter. To further enhance the flow of fluid through passage 40 a wedge deflector 45 is positioned on an end of housing 12 upstream of outlet 42. Wedge deflector 45 has a surface that is tilted or inclined to create an advantageously low pressure area adjacent outlet 42. If the angle of the surface of deflector 45 is too small with respect to the direction of fluid flow an insufficient pressure drop is created at outlet 42. Conversely, if the angle of the surface of deflector 45 is too large with respect to the direction of fluid flow an insufficient pressure drop is created at outlet 42. Preferably, the angle of the surface of deflector 45 is between 47° and 60° with respect to a center axis of the duct in which sensor 10 is placed.

Figure 3:
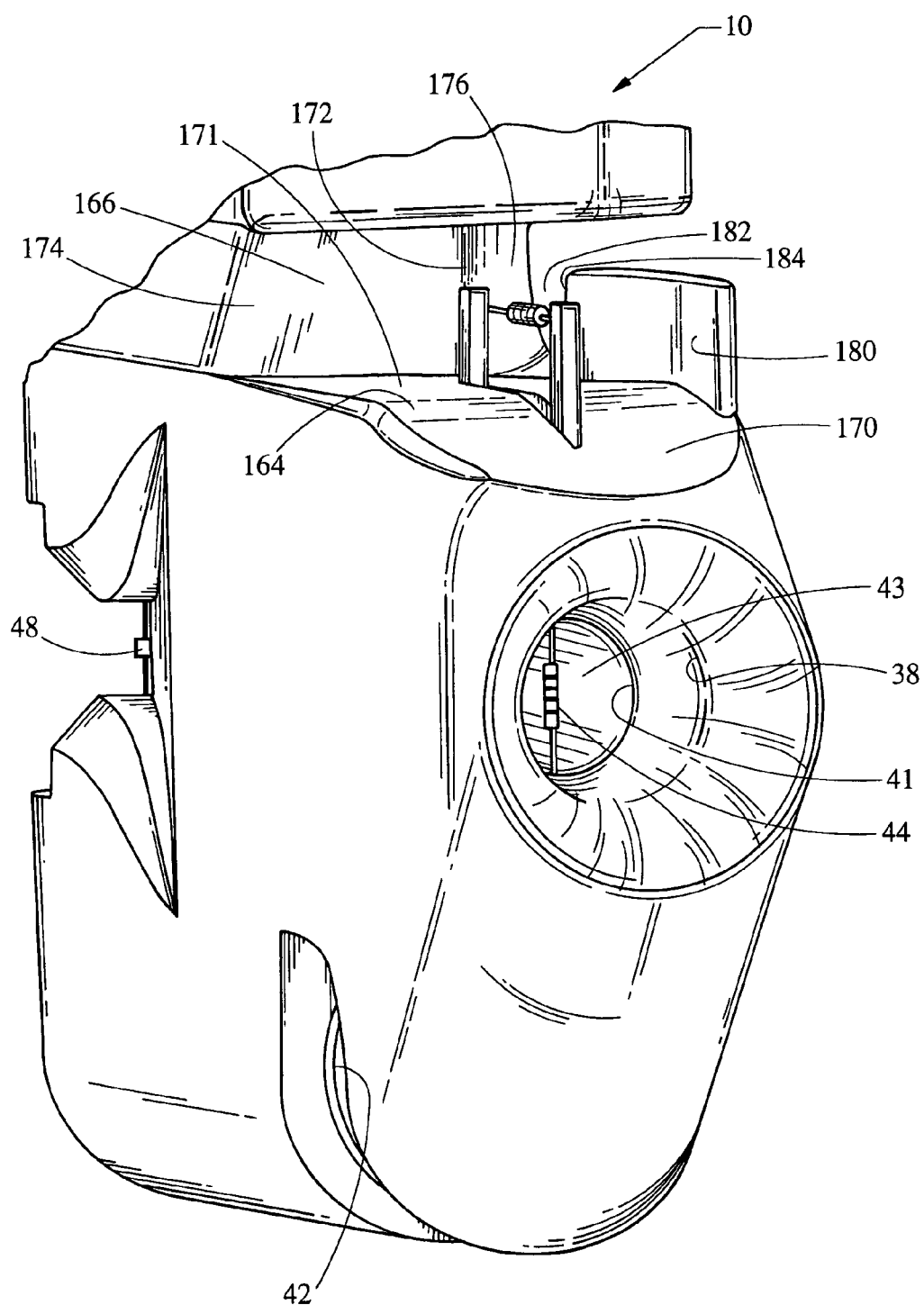
FIG. 3 is a partial cut away magnified view the front and left side of a sensor element portion of the mass fluid flow sensor in accordance with an embodiment of the present invention.
Figure 4:
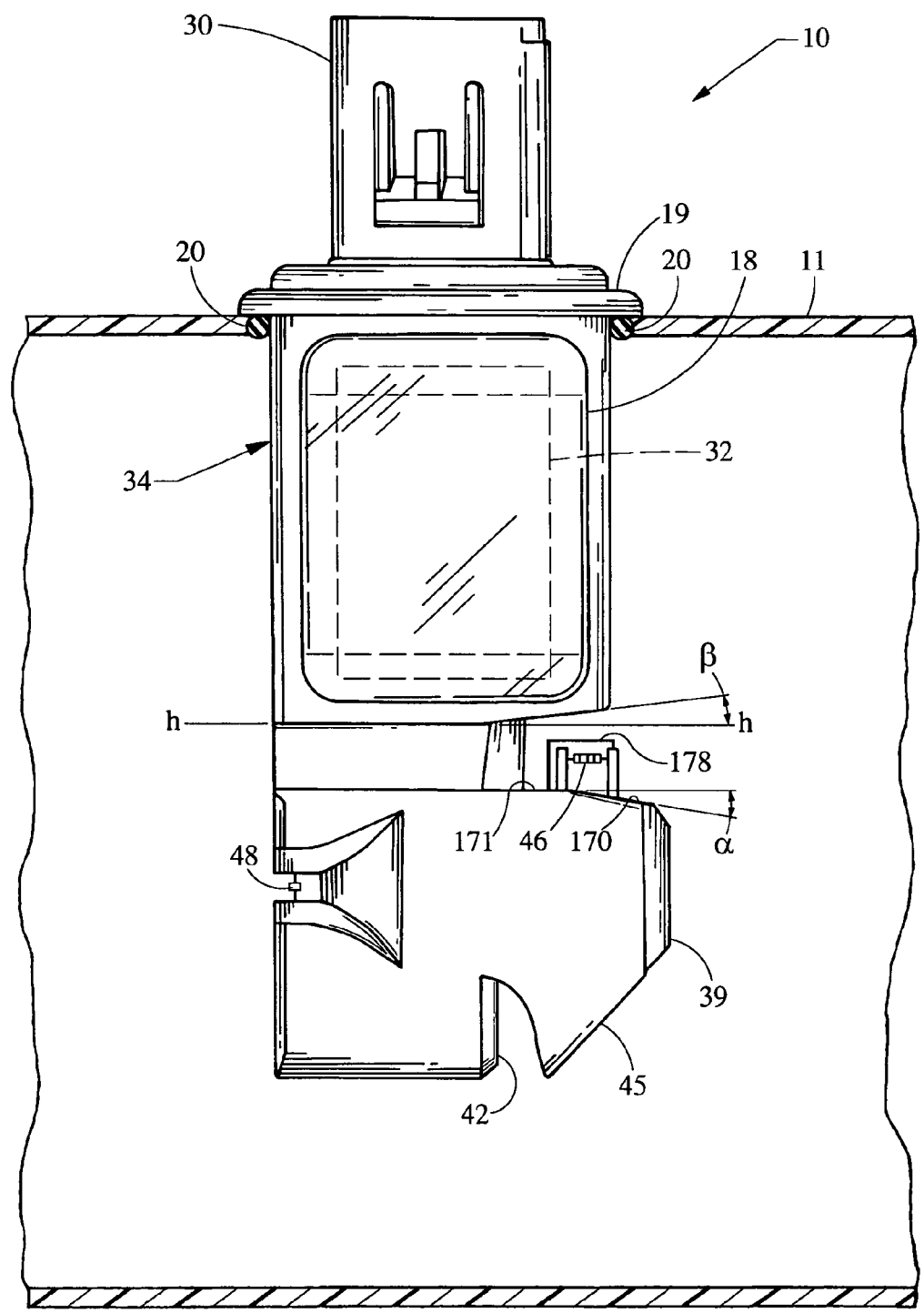
FIG. 4 is a left side view of the mass fluid flow sensor in accordance with an embodiment of the present invention.

As illustrated in FIGS. 3 and 4, a plurality of resistive elements are operatively disposed and supported by housing 12 and are in electrical communication with circuit module 32. Preferably, the plurality of resistive elements are connected to circuit module 32 via electrical conductors, such as an integrally molded lead frame. The resistive elements include a hot wire element 44, a cold wire element 46 and an internal air (or fluid) temperature (IAT) element 48. Generally, these elements change resistance as a function of temperature.

Circuit module 32 senses a fluid, such as, air flowing through passage 11 by monitoring the power dissipated or change in resistance of the elements (44, 46, and 48). Circuit module 32 may be a single integrated circuit chip or a substrate having discrete, as well as, integrated circuits mounted thereon. The sensed resistance change in the elements is converted to an output signal by circuit module 32 that is received by the electronic engine control system (not shown). Typically, the electronic engine control system regulates the quantity of fuel injected into the engine by controlling the air to fuel ratio.

Figure 2:
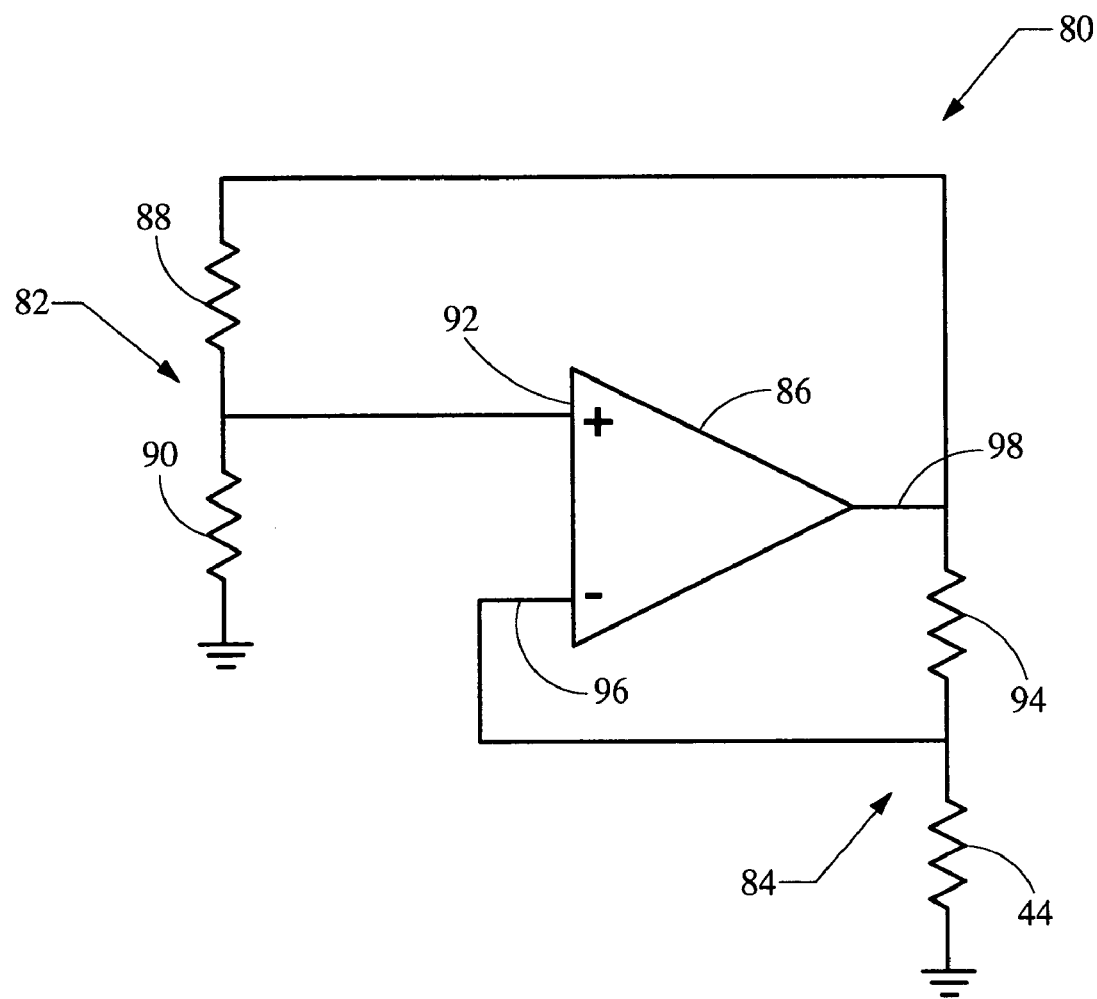
FIG. 2 is a schematic of a circuit in communication with the electrical elements for determining a characteristic of the fluid flow sensor, in accordance with an embodiment of the present invention.

The IAT or element 48 is generally a thermistor or similar device. Element 48 is located on housing 12 to ensure an accurate reading of the temperature of the air charge in passage 11 during the induction cycle of the internal combustion engine. As shown in FIGS. 2 and 4, element 48 is located, preferably, external of flow passage 40 to minimize the fluid heating effects caused by the heat dissipated from hot element 44.

In a preferred embodiment of the present invention, a fluid flow sensor 10 is provided having elements 44 and 46 made of platinum wire wound resistors. Generally, these elements have a positive temperature coefficient. Thus, any temperature change in the fluid flowing through passage 11 will correspond with a resistive change in the elements in the same direction. That is, if the temperature increases, the resistance will increase, and if the temperature decreases, the resistance will decrease. Preferably, hot element 44 is located at exit 41 of nozzle 39 and within critical area 43. The location of the hot element within the critical area ensures that fluid, having a uniform velocity profile, flows over the hot element causing heat to dissipate uniformly from the entire surface of the element. Thus, the present invention provides enhanced fluid flow detection.

In an embodiment of the present invention, hot element 44 may, for example, have a resistance of approximately 20 Ohms at 21.1° C. Thus, if the temperature increases by 17.2° C. the resistance of the hot wire will increase by approximately 0.025 Ohms. The hot element 44 is used primarily for detecting the velocity of the fluid flowing through passage 40. The mass of fluid flowing through passage 40 may be derived from the detected velocity.

The cold wire element 46 may, for example, have a nominal resistance of approximately 500 Ohms at 21.1° C. If the temperature of the cold wire is increase by 17.2° C. the resistance of cold wire will increase by approximately 0.5 Ohms. The primary purpose of the cold wire element 46 is to provide temperature correction.

In operation hot wire element 44 is held at approximately 200° C. above the ambient air temperature. This is accomplished by placing the hot wire element in a voltage divider circuit. With reference to FIG. 2, an exemplary voltage divider circuit 80 for fixing hot wire element 44 at a desired constant resistance and temperature is illustrated, in accordance with the present invention. In an embodiment of the present invention circuit 80 is disposed in integrated circuit 32, along with other control circuitry. Exemplary circuit 80 includes two voltage divider networks 82 and 84 in communication with an operational amplifier 86. Voltage divider network 82 generally has two 500 Ohm resistors 88 and 90 which form a 50% voltage divider network and force plus pin 92 of op-amp 86 to half the output voltage on line 98. The other voltage divider network 84 includes generally a 25 Ohm resistor 94 in series with the hot wire element 44. The minus pin 96 of op-amp 86 is connected between resistor 94 and hot wire element 44. Thus the ratio of this network starts with a ratio of 20 Ohms to 45 Ohms, so minus pin 96 is forced to $20/45^{th}$ of the output voltage. For example, the op-amps output voltage on output line 98 will increase if the voltage on plus pin 92 is greater than the voltage on the minus pin 96. Likewise, the output voltage on line 98 will decrease if the voltage on plus pin 92 is less than the voltage on minus pin 96. Accordingly, the op-amp's output voltage on line 98 will increase or decrease by a voltage amount necessary to force the voltage on plus pin 92 to equal the voltage on minus pin 96.

Since resistor network 82 provides a greater voltage on plus pin 92 that is 50% of the output voltage as compared to 44% on minus pin 96, the op-amps output voltage will increase on line 98. As the voltage increases, the power dissipated by the hot wire element 44 causes an increase in resistance of the hot element. It takes approximately one quarter watt of power in still air to increase the temperature of hot element 44 by 93.3° C. A 93.3° C. increase in temperature raises hot wire element 44's resistance by 5 Ohms. The ratio of hot-wire element 44 resistance at the increased temperature to the total resistance in resistor network 84 forms a 50% voltage divider network. Thus, the plus and minus pins 92 and 96 of op-amp 86 are at the same voltage since both networks 82 and 84 form 50% voltage divider networks. Thus the temperature of hot wire element 44 is forced to approximately 132.2° C.

The circuit 80 provides an output on line 98 to an electronic engine control module (not shown) that determines the proper air fuel ratio for optimal engine operation, as well known in the art. Since it takes a quarter watt as disclosed above for voltages on plus and minus pins 92 and 96 to be equal, the voltage across hot wire element 44 and resistor 94 can be calculated using the equation: Power= (voltage)²/resistance and then solving for voltage (V): V=(power×resistance)$^{1/2}$ or $(0.25 \times 25)^{1/2}$. Since the voltages across resistors in series add the nominal output of the circuit is 5 volts for no air flow. Obviously, more circuitry would be used to level shift and amplify the output of circuit 80.

As air flows over hot wire element 44, power in the form of heat is transferred from the hot wire element to the air. Heat removed from the hot wire element 44 causes the resistance of element 44 to decrease. Decreasing resistance causes the voltage applied to the minus pin 96 to decrease. Accordingly, the output voltage on line 98 would increase causing more power to be dissipated by hot wire element 44. Thus, the increase in power dissipated by hot wire element 44 causes the temperature of element 44 to increase and return to 132.2° C. When this temperature is reached, the voltage on pins 92 and 96 of op-amp 86 will be at equilibrium.

Accordingly, since the circuit 80 regulates the resistance of hot wire element 44, the output of the circuit on line 98 is proportional to the square root of the power removed from the hot wire times two minus 5 volts, for example. Nominal power dissipated by the hot wire element 44 is one-quarter of a watt which is the amount of power needed to keep the hot wire element 44 at 132.2° C. Any heat removed from the hot wire is replaced by applying more power to element 44. Resistance of the hot wire is regulated to 25 Ohm, thus resistance is considered to be constant. Power removed equals the power applied minus the amount needed to maintain the hot wire at 132.2° C. Solving the power formula for voltage: v=(power×resistance)$^{1/2}$, any increase in power applied to the hot wire element 44 is also applied to the 25 Ohm resistor. Therefore, the voltage necessary to compensate for power removed from element 44 is doubled.

For proper operation of sensor 10, the temperature of hot wire element 44 needs to be maintained at 200° C. above ambient temperature. If the ambient temperature is constant there is no need for temperature correction. That is, a constant difference in temperature guarantees the same amount of power will be removed from the hot wire element 44 for a given air flow. However, when a fluid flow sensor is placed in an intake duct of an automobile, the ambient air temperature is not constant. Typically, sensor 10 will be exposed to temperatures below freezing and above boiling. Thus, air flow temperatures lower than expected will cause a larger than desired output voltage and temperatures higher than expected will cause a lower than desired output voltage.

The present invention provides temperature correction to compensate for the variable ambient temperature environment present in an automobile. Temperature correction is achieved through the use of the cold wire element 46. The cold wire element 46 is placed in resistor network 82 in place of resistor 90, as illustrated in FIG. 3. Circuit 80 uses cold wire element 46 for temperature compensation. Element 46 is supported by housing 12 and is placed in the air stream outside of flow passage 40. Placing cold wire element 46 in the air stream allows the circuit to quickly respond to changes in the ambient air temperature. The temperature of cold wire element 46 will follow the temperature changes of the incoming air. Since the resistance of the cold wire element (500 Ohms) is relatively large compared to the voltage drop across the element, the power dissipated is very small. For example, at 21.1° C. the resistance of element 46 is 500 Ohms with a voltage drop of 2.5 volts. Moreover, the power dissipated by element 46 is 0.0125 watts which results in a temperature increase of about 12.2° C.

Accordingly, the resistance of the cold wire element 46 would increase by 5 Ohms and resistor network 82 resistance ratios would change. For example, the voltage applied to plus pins 92 would equal 505/1005 or 50.25% of the output voltage on line 98. In turn resistor network 84 will also have to form a ratio equal to 50.25% of the output voltage. Thus, to form the same ratio, the hot wire resistance would need to be maintained at 25.25 Ohms to develop the same resistance ratio of 50.25%. Thus, the hot wire element 44 will be maintained at 200° C. above the cold wire element 46 or 137.7° C. if the ambient temperature is 21.1° C. Cold wire element 46 is 12.2° C. above the ambient temperature of 21.1° C. Thus, the temperature difference that is necessary for handling environmental extremes is maintained. The nominal output of this circuit is still five volts. It takes ¼ watt of power to raise the temperature of the hot wire element by 93.3° C. Solving the power equation for current (i), i=(power/resistance)$^{1/2}$. Thus, current in the hot wire network equals 0.099503 amps $((0.25/25)^{1/2})$. The output voltage is then (0.099503×50.25), which is approximately five volts. Circuit 80 in FIG. 3 can dynamically adjust to ambient air temperature changes because the change in the cold wire network is directly proportional to the properties of the hot wire network. The values for resistance and changes in resistance are solely for explanatory purposes and other values certainly may be used.

With continuing reference to FIGS. 1–4, a preferred embodiment of a mass fluid flow sensor 10 is illustrated having an auxiliary flow passage or a cold wire flow passage 60. Auxiliary flow passage 60 is disposed in housing 12 and located adjacent to flow passage 40. However, flow passage 60 may be located on another portion of housing 12 remote from flow passage 40. Auxiliary flow passage 60 includes a ceiling 162 a floor 164 and rear wedged-shaped deflector wall 166.

As illustrated in FIGS. 3 and 4, floor 164 includes an angled first portion 170. Angled portion 170 is inclined relative to a rear portion 171 of floor 164 by a predefined angle α. Angle α is preferably between one and thirty degrees.

Further, ceiling 162 of auxiliary flow passage 60 is inclined by an angle β relative to a horizontal axis H of housing 12. Angle β is generally between two and six degrees. Rear wall 166 is formed in the shape of a wedge having a peak 172 and angled wall surfaces 174 and 176 which progressively diverge from an initial meeting point at peak 172. The above described configuration of ceiling 162 and floor 164 provide enhanced cooling of cold wire element 46. Ceiling 162 and floor 164 focus the fluid or air flowing in the intake duct to increase the flow across cold wire element 46. The increased flow across cold wire element 46 prevents Overheating of the cold wire element, thus providing a more accurate mass fluid/air flow measurement.

With continued reference to FIGS. 1–4, a wall 178 is positioned within auxiliary flow passage 60, in accordance with an embodiment of the present invention. Wall 178 is positioned on one side of auxiliary flow passage 60 between floor 164 and ceiling 162 of the flow passage. Wall 178 is preferably mounted to floor 164 and does not contact or reach ceiling 162 or rear wall 166. Wall 178 includes an inboard surface 180 that is curved inboard toward the end of the cold wire element 46. Alternatively, wall 178 may be formed using several straight surface portions that join at predefined angles. It is contemplated that corners where the surface portions join have a smooth transition or defined a radius. For example, the curve in surface 180 may be in the shape of a portion of an ellipse when viewed looking down at the top of wall 178. This wall configuration deflects ambient duct air towards cold wire element 46. Thus, a large portion of the duct air flows through and around the cold wire element form a first side and exits the opposite side of element 46. An opening 182 is provided between rear wall surface 176 of rear wall 166 and a wall end 184 of wall 178. Wall 178 and opening 182 direct air toward cold wire element 46 and create a low pressure region at opening 182 causing air to be drawn past cold wire 46 at an increased velocity relative to the velocity of the air flowing in the intake duct. Of course, other wall configurations are contemplated by the various embodiments of the invention. For example, wall 178 may be attached to the ceiling 162. Further, wall 178 may be attached to the opposite side of passage 60 to either the ceiling 162 or floor 164.

An application for sensor 10 is in the air intake system of an automobile. The air intake system typically includes an air intake duct, an air filter, an air outflow duct and an intake manifold. The air intake duct transports ambient air to the air filter. The air filter cleans the air and delivers the clean air to the air outflow duct. Mass fluid flow sensor 10 is inserted in and fixedly secured to the air outflow duct through an aperture in the air outflow duct. In operation, as air is drawn into air intake duct and flows through to the air outflow duct, a portion of the intake air flows through sensor 10. All of the intake air eventually exits the air outflow duct and enters the air intake manifold of the vehicle's engine. Electrical control signals containing information regarding the amount of air flowing through the air duct is communicated to the automobile's electronic control system through a connector and wire harness. The information is derived from measurements and processing carried out on integrated circuit 32.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A device for measuring fluid flowing in a duct, the device comprising:
    a housing positionable in the fluid carrying duct, the housing defining a first flow passage for receiving a first portion of the fluid flowing in the duct;
    an inlet connected to the housing and in fluid communication with the first flow passage;
    an auxiliary flow passage defined by at least a first and second surface disposed in the housing, wherein the first surface has a first surface portion inclined relative to a second surface portion;
    a wall disposed in the auxiliary flow passage;
    a first electrical element mounted in the first flow passage proximate to the inlet; and
    a second electrical element mounted in the auxiliary flow passage, and
    wherein the first and second electrical elements are connected to at least one circuit for detecting a characteristic of the flowing fluid.

2. The device of claim 1 wherein the housing has a circuit portion for supporting an electrical circuit in communication with the first and second electrical elements.

3. The device of claim 2 wherein at least a portion of the circuit portion of the housing is disposed in the fluid carrying duct.

4. The device of claim 1 wherein the inlet is a nozzle having elliptically converging side walls.

5. The device of claim 1 wherein the first electrical element is a hot wire element.

6. The device of claim 1 wherein the second electrical element is a cold wire element.

7. The device of claim 1 wherein the first and second electrical elements are part of a bridge circuit.

8. The device of claim 1 wherein the first surface is a ceiling of the auxiliary flow passage that is inclined relative to the second surface.

9. The device of claim 1 wherein the wall is attached to the second surface of the auxiliary flow passage.

10. The device of claim 1 wherein the wall is attached to the first surface of the auxiliary flow passage.

11. The device of claim 1 wherein the wall has a curved inboard surface.

12. The device of claim 1 wherein the wall has an end that substantially terminates at an end of the second electrical element.

13. The device of claim 1 wherein a portion of the inboard surface of the wall is substantially parallel with the second electrical element.

14. A device for measuring fluid flowing in a duct, the device comprising:

a housing positionable in the fluid carrying duct, the housing defining a first flow passage for receiving a first portion of the fluid flowing in the duct;

a nozzle connected to the housing and in fluid communication with the first flow passage;

an second flow passage defined by a floor, a ceiling, a side wall and a rear wall disposed in the housing, wherein the floor has a first floor portion inclined relative to a second floor portion;

a first electrical element mounted in the first flow passage proximate to the nozzle; and a second electrical element mounted in the second flow passage on at least one of the floor, the ceiling, the side wall and the rear wall, and wherein the first and second electrical elements are connected to a circuit for detecting a characteristic of the flowing fluid.

15. The device of claim 14 wherein the housing has a circuit portion for supporting an electrical circuit in communication with the first and second electrical elements.

16. The device of claim 15 wherein at least a portion of the circuit portion of the housing is disposed in the fluid carrying duct.

17. The device of claim 14 wherein the nozzle includes elliptically converging side walls.

18. The device of claim 14 wherein the first electrical element is a hot wire element.

19. The device of claim 14 wherein the second electrical element is a cold wire element.

20. The device of claim 14 wherein the first and second electrical elements are part of a bridge circuit.

21. The device of claim 14 wherein the ceiling of the second flow passage is inclined relative to the floor.

22. The device of claim 14 wherein the side wall is attached to the floor of the second flow passage.

23. The device of claim 14 wherein the side wall has a curved inboard surface.

24. The device of claim 14 wherein the side wall has an end that terminates at an end of the second electrical element.

25. The device of claim 14 wherein the side wall is substantially parallel with the second electrical element.

26. The device of claim 14 wherein the rear wall of the second flow passage further comprises a wedge-shaped rear wall.

27. The device of claim 14 further comprising an air outlet defined by the ceiling, the floor, the rear wall and an end of the side wall of the second flow passage.

28. A device for measuring fluid flowing in a duct, the device comprising:

a housing positionable in the fluid carrying duct the housing defining a first flow passage for receiving a first portion of the fluid flowing in the duct;

an inlet connected to the housing and in fluid communication with the first flow passage;

an auxiliary flow passage defined by at least a first and second surface disposed in the housing, wherein the first surface has a first surface portion inclined relative to a second surface portion and wherein the auxiliary flow passage further comprises a wedge-shaped rear wall;

a first electrical element mounted in the first flow passage proximate to the inlet;

a second electrical element mounted in the auxiliary flow passage, and wherein the first and second electrical elements are connected to at least one circuit for detecting a characteristic of the flowing fluid.

* * * * *